US010841371B2

(12) United States Patent
Abalyaev et al.

(10) Patent No.: US 10,841,371 B2
(45) Date of Patent: Nov. 17, 2020

(54) METHOD AND SYSTEM OF ORGANIZING A MESH NETWORK

(71) Applicant: OBSCHESTVO S OGRANICHENNOI OTVETSTVENNOSTYU "VERIMAG", Moscow (RU)

(72) Inventors: Maxim Valentinovich Abalyaev, Moscow (RU); Denis Valerievich Ionov, Moscow (RU)

(73) Assignee: OBSCHESTVO S OGRANICHENNOI OTVETSTVENNOSTYU "VERIMAG", Moscow (RU)

( * ) Notice: Subject to any disclaimer, the term of this patent is extended or adjusted under 35 U.S.C. 154(b) by 0 days.

(21) Appl. No.: 16/319,392

(22) PCT Filed: Aug. 26, 2016

(86) PCT No.: PCT/RU2016/000578
§ 371 (c)(1),
(2) Date: Jan. 21, 2019

(87) PCT Pub. No.: WO2018/021928
PCT Pub. Date: Feb. 1, 2018

(65) Prior Publication Data
US 2019/0245916 A1  Aug. 8, 2019

(30) Foreign Application Priority Data

Jul. 28, 2016 (RU) ................. 2016131201

(51) Int. Cl.
*H04L 29/08* (2006.01)
*H04W 84/18* (2009.01)
(Continued)

(52) U.S. Cl.
CPC .......... *H04L 67/1044* (2013.01); *H04L 41/12* (2013.01); *H04L 63/061* (2013.01);
(Continued)

(58) Field of Classification Search
CPC ... H04L 67/1044; H04L 41/12; H04L 63/061; H04W 84/18; H04W 60/00; H04W 76/00;
(Continued)

(56) References Cited

U.S. PATENT DOCUMENTS

2008/0253340 A1* 10/2008 Hirano ................... H04L 12/66
370/338
2012/0163234 A1*  6/2012 Sulc ....................... H04L 61/35
370/254

(Continued)

OTHER PUBLICATIONS

Elyse Betters et al. "What is FireChat and how does it work without network connectivity?" Sep. 30, 2014.
(Continued)

*Primary Examiner* — Michael A Keller
(74) *Attorney, Agent, or Firm* — BCF LLP

(57) ABSTRACT

The claimed solution relates to the field of organizing a data network between a group of devices, in particular, by organizing a mesh network. The technical result is an increase in flexibility and speed of the organization of the mesh network without connection to an external network or the Internet, by assigning network devices as node repeaters, providing the construction of network levels. The claimed result is achieved due to the method of organizing a mesh network for communication between many devices that do not require connection to an external global network, such as the Internet, the key feature of which is the ability to change the status of devices connected thereto, to organize the network cells formed with the help of node devices that are (Continued)

activated as routers when the limit for the number of devices connected to the network nodes is reached.

15 Claims, 16 Drawing Sheets

(51) Int. Cl.
| | |
|---|---|
| H04W 60/00 | (2009.01) |
| H04W 76/00 | (2018.01) |
| H04W 12/04 | (2009.01) |
| H04L 29/06 | (2006.01) |
| H04W 76/10 | (2018.01) |
| H04W 12/06 | (2009.01) |
| H04W 12/00 | (2009.01) |
| H04L 12/24 | (2006.01) |
| H04W 84/20 | (2009.01) |

(52) U.S. Cl.
CPC ..... *H04L 63/065* (2013.01); *H04W 12/00305* (2019.01); *H04W 12/04031* (2019.01); *H04W 12/0609* (2019.01); *H04W 60/00* (2013.01); *H04W 76/00* (2013.01); *H04W 76/10* (2018.02); *H04W 84/18* (2013.01); *H04W 84/20* (2013.01)

(58) Field of Classification Search
CPC ............. H04W 76/10; H04W 12/0609; H04W 12/00305; H04W 84/20; G06F 3/048
See application file for complete search history.

(56) References Cited

U.S. PATENT DOCUMENTS

| | | |
|---|---|---|
| 2012/0221435 A1 | 8/2012 | Puura |
| 2013/0091288 A1 | 4/2013 | Shalunov |
| 2015/0174481 A1 | 6/2015 | Tobin |
| 2015/0289100 A1 | 10/2015 | Stringer, II |
| 2015/0341331 A1* | 11/2015 | Weksler ................ H04L 63/08 726/4 |
| 2017/0245104 A1* | 8/2017 | Klimek ................ H04B 17/27 |
| 2018/0288563 A1* | 10/2018 | Krzych ................ H04W 4/02 |

OTHER PUBLICATIONS

The Nearpod Team "Revolutionize your classes with the new Nearpod Android app!" Mar. 7, 2016

* cited by examiner

METHOD AND SYSTEM OF ORGANIZING A MESH NETWORK

TECHNICAL FIELD

The claimed solution relates to the field of organizing a data network between a group of devices, in particular, by organizing a mesh network.

BACKGROUND OF THE INVENTION

The NEARPOD system is known to provide an interconnected viewing of presentations on a variety of networked user devices. NEARPOD is primarily used in education and allows teachers to create and share presentations for their lessons with students directly during the lesson by sending via email or social media the presentation code that students enter from their mobile phones or tablets in order to connect to a common activity.

The main problem with this solution is the need to connect to the Internet through an external access point, which makes it unsuitable for use in places without access to the global network.

An alternative to this solution is the FireChat application, which provides a connection via a wireless mesh network over a radio data link, such as Wi-Fi or Bluetooth, and can organize a communication network without the need to connect to a global network.

The disadvantage of this solution is the principle of connecting devices in the peer-to-peer network, i.e. the device to the device, where all devices are equal, which in turn leads to a decrease in the flexibility of construction and performance of the network, when the chain of mesh networks is broken, as well as in the absence of the possibility of assigning specific devices as the node repeaters.

SUMMARY

The goal of this invention is to create a technology to organize communication between many devices without the need to connect to an external network or the Internet, which has a high connection speed, stable operation and fast speed of network rebuilding at the breaking of its nodes.

The technical result is an increase in flexibility and speed of the organization of the mesh network without connection to an external network or the Internet, by assigning network devices as node repeaters, providing the construction of network levels.

The claimed result is achieved by the way the mesh network is organized to communicate between multiple devices, with the steps on which the following takes place:

on the master device (MD) one activates the function of organizing the data mesh network and forms a data packet (DM) to connect the devices of lower levels, creates a network name and a pin code, the data packet containing at least an encrypted key to connect to the master device (MD), wherein the master device (MD) containing a specified limit on the number (L) of the connections of devices thereto;

transmits the data packet (DM) to at least one device (N) connected directly to the master device (MD), and when connected to the master device (MD) on the device (N) enters a name of the device (N), network pin code and transmits a data packet (DN) containing a return key calculated on the basis of the data of the device (N) and the information received in the data packet (DM) from the master device (MD);

in response to the data packet (DN) received from the device (N), the master device (MD) calculates a key for connection on the basis of the data of the device (MD) and the information from the data packet (DN) received from the device (N), comparing the received keys on the master device (MD), and if the keys coincide, establishes a permanent connection with the device (N), and such device (N) changes its status to a slave device (SD);

wherein after reaching the limit (L) on the number of connections when trying to connect a new device (N) in excess of the limit (L), the master device (MD) commands the slave devices (SD) to activate the router/transmitter mode, and on the basis of the said command a first lowest level (LL1) of the mesh network (MN) is formed, by changing the status of the devices (SD) connected directly to the master device (MD) to the activated devices (AD), and wherein each new device (N) trying to connect to the mesh network (MN) being connected to the device (D1) of the first lowest level (LL1), which in response to the connection of a new device (N) changes its status to the slave device (SD) connected through one of the routers/line repeaters of the first lowest level (LL1) to the master device (MD); and after reaching the limit of the number of connections (L) when trying to connect a new device (N) over and above the limit for the lowest level (LL1), the devices (D1) close the possibility of connecting new devices (N), while the devices (N) request the connection from the master device (MD), which in response to the requests from the devices (N) analyzes the mesh network map and sends a command to the devices (SD) connected to the lowest level (LL1) to activate the router/repeater mode, on the basis of the command mentioned above, the second lowest level (LL2) of the mesh network (MN) being formed by changing the status of the device (SD) to the activated device (AD), and each new device (N) being connected when trying to connect to the mesh network connects to the device (D2) of the second lowest level (LL2), wherein the device (D2) in response to the connection of a new device (N) changes its status to a slave device (SD) connected through one of the routers/repeaters of the device (D2) of the second lower level (LL2) to the router/repeater of the device (D1) of the first lower level (LL1) connected to the master device (MD).

In a one example of the embodiment a command to change the status of the device is transmitted using the data packet (DM).

In another example of the embodiment, the data packet (DM) is formed by the master device (MD) in response to achieving a limit on the number of connections (L).

In another example of the embodiment, the master device (MD) of the upper level is responsible for forming, configuring and monitoring the network in real time.

In another example of the embodiment, the master device (MD), when connected to one or more lower-level devices, transmits data packets containing control commands and a globally unique identifier of the device for which it is intended.

In another example of the embodiment, when the group connection limit (L) for new devices (N) to the devices of the first lower level (D1) is reached, the first lower level devices (D1) closes the possibility of connecting new devices (N).

In another example of the embodiment, each of the slave devices (SD) connected directly to the master device (MD) transmits its status data directly to the master device (MD).

In another example of the embodiment, all devices of the first (D1) and second (D2) levels generate a data packet to connect new devices (N) and then convert them to slave devices (SD) by changing their status.

In another example of the embodiment, each of the second level devices (D2) contains a set limit (L) on the connection of new devices (N), upon reaching of which it stops generating the data packet for the connection of new devices (N).

In another example of the embodiment, device data, on the basis of which the response key for connecting new devices (N) to the master device (MD) is calculated, include the following: device name, network name, network pin code, master device (MD) name, globally unique device identifier, code information.

In another example of the embodiment, devices in the mesh network are connected via wired and/or wireless communication.

In another example of the embodiment, once the number of connections (L) is limited when trying to connect a new device (N) above the line limit of second lower level (D2), the devices (D2) close the possibility of connecting new devices (N), while the devices (N) request connection from the master device (MD), which in response to the above requests from the devices (N) analyzes the network map and sends a command to the slave devices (SD) connected to the line devices (D2) to activate router/repeater mode, based on the command mentioned above, the third lowest level (LL3) of the mesh network (MN) being formed by changing the status of the slave device (SD) to the activated device (AD), and each new device (N) being connected to the line device (D3) when trying to connect to the mesh network, and the line device (D3) in response to the connection of a new device (N) thereto changes its status to a slave device (SD) connected via one of the lower level line routers/repeaters (D3) of the third lower level to the line router/repeater (D2) of the second lower level, connected via one of the line routers/repeaters (D1) of the first lower level to the master device (MD).

In another example of the embodiment, if the connection to one or more routers/repeaters is broken, the slave devices (SD) and/or lower-level devices connected through it change their status to new devices (N) and start re-establishing the connection.

In another example of the embodiment, the connection is re-established by connecting to the available active devices (AD) and/or the master device (MD).

The claimed result is also achieved through a mesh network system for communication between multiple devices, which contains:
  master device (MD) designed with the possibility of performing the following actions:
  activating of the mesh data network organization function;
  creating a network name, a pin code to access the network;
  forming a data packet (DM) for connecting the lower-level devices, wherein the data packet (DM) containing at least an encrypted key to connect to the master device (MD);
  transferring the data packet (DM) to at least one device (N) connected directly to the master device (MD),
  and the master device (MD) contains a specified limit on a number of connections (L) of devices thereto;
  at least one device (N) designed with the possibility of direct connection to the master device (MD), and when connected to the master device (MD), on the device (N) entering name of the device (N), network pin code and transmits a data packet (DN) containing a return key, calculated on the basis of a data of the device (N) and an information received in the data packet (DM) from the master device (MD);
  in response to the data packet (DN) received from the said device (N), the master device (MD) calculates a key for connection on the basis of the data of the device (MD) and the information from the data packet (DN) received from the device (N), compares the received keys and, if the said keys coincide, establishes a permanent connection with the device (N), and such device (N) changes the status to the slave device (SD);
  wherein
  after reaching the limit (L) on the number of connections when trying to connect a new device (N) in excess of the limit (L) mentioned above, the master device (MD) sends a command to the slave devices (SD) to activate the router/repeater mode, and on the basis of the command the first lower level (LL1) devices (D1) of the mesh network (MN) is formed by changing the status of slave devices (SD) connected directly to the master device (MD) to a status of the activated devices (AD), and each new device (N) when trying to connect to the mesh network being connected to the device of the line (D1), which in response to the connection of a new device (N) changes its status to the slave device (SD), connected through one of the line routers/repeaters (D1) of the first lower level (LL1) to the master device (MD);
  and
  after reaching the limit of the number of connections (L) when trying to connect a new device (N) over and above the limit for the line (D1), the devices (D1) close the possibility of connecting new devices (N), while the devices (N) request the connection from the master device (MD), which in response to the above requests from the devices (N) analyzes the mesh network map and sends a command to the slave devices (SD) connected to devices (D1) of the line (LL1) to activate the router/repeater mode, on the basis of the command mentioned above, wherein the second lowest level (LL2) devices (D2) of the mesh network (MN) being formed by changing the status of the slave device (SD) to the activated device (AN), and each new device (N) being connected to the device (D2) when trying to connect to the mesh network (MN), and the line device (D2) in response to the connection of a new device (N) changes its status to a slave device (SD) connected through one of the routers/repeaters (D2) of the second lower level (LL2) to the router/repeater (D1) of the first lower level (LL1) connected to the master device (MD).

TERMS AND DEFINITIONS

Figure 1:
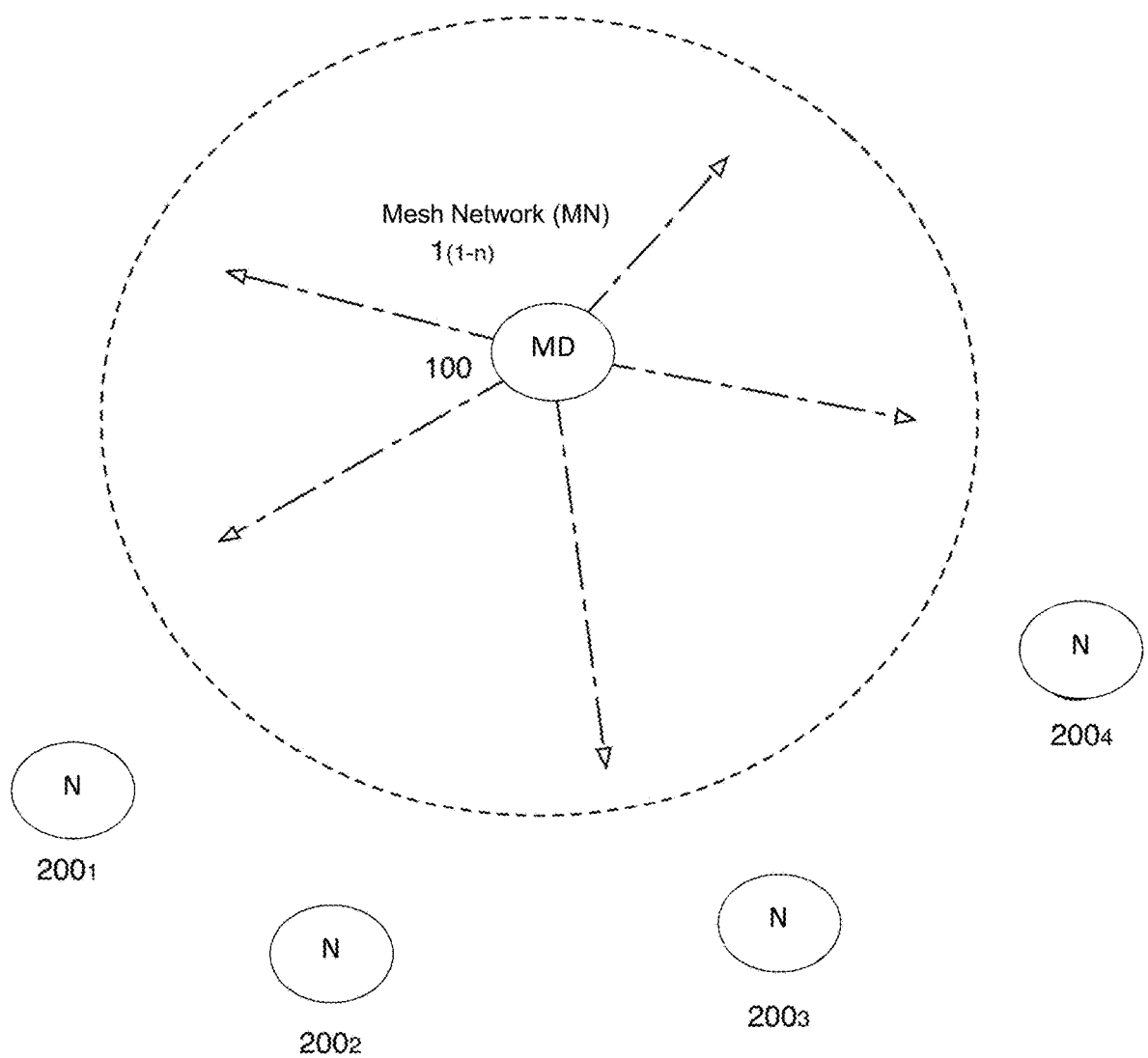
FIG. 1-FIG. 2 illustrate the mesh network diagram when connecting devices to the master device.

A mesh network (MN) is a network topology of computer networks based on the principle of cells, in which computer devices interconnect, using any available channels of communication and forming a network capable of acting as a switch and/or router/repeater for the rest of the participants.

A higher-level master device (MD) is the device responsible for forming the network.

A new device (N) is a device that is not connected to the master device (MD) or router/repeater, but is within the network range of the master device (MD) or another router/repeater device.

A slave device (SD) is a device that is connected to the master device (MD) and executes its commands.

A node device or a network cell $(D_1)$-$(D_n)$ is a router/repeater that has the properties of both a slave device (SD) connected to the master device (MD) and a router/repeater that executes commands received from the master device (MD) to both perform actions on the device $(D_1)$-$(D_n)$ itself and connect other slave devices (SD) for a two-way transmission of data packets from the master device (MD) to the slave device (SD).

A group limit (L) is a set threshold for the number of devices that can be connected to the same device type at the same time. A limit (L) is set for a group of slave devices (SD) connected to the same device $(D_1)$-$(D_n)$ or directly to master device (MD) and is determined by the master device (MD) configuring the network.

A mesh network map is a list of devices with globally unique identifiers and path descriptions from the master device (MD) to the devices $(D_1)$-$(D_n)$ and (SD).

Data packets (DM) are a list of parameters containing information and commands from the master device (MD) to the slave device (SD) to connect a new slave device (SD) to the device (MD) or to the device converted from a slave device (SD) to a node device $(D_1)$-$(D_n)$. Data packets are transmitted in two directions from (MD) to the slave devices (SD) and devices $(D_1)$-$(D_n)$ and from them to the master device (MD). The master device (MD) can transmit data packets (DM) to all devices at once or individually, or form groups of devices or slave devices (SD) for which data packets (DM) are transmitted.

A response data packet (DN) is a list of parameters transmitted from the new devices (N) to the master device (MD) or $(D_1)$-$(D_n)$ to form communication therewith.

A network formula (F) is a set of definitions leading to the organization of a mesh network consisting of the master device (MD), slave devices (SD), nodes—routers/repeaters $(D_1)$-$(D_n)$ and data packets (DM).

A lower level of the mesh network (LL1, (LL2), (LL3) . . . (LLn) is formed by routers/repeaters $(D_1)$-$(D_n)$ and it is the lower one relative to the master device (MD).

The number of the lower network level (LL1 . . . LLn) is determined relative to the master device (MD) by the number of routers/repeaters $(D_1)$-$(D_n)$ in one connection chain. The number of network layers can be unlimited. For example: (MD)-(D1)-(D1)-(SD) equivalent to (MD)-(D1)-(D2)-(SD). Where D1 is the first lower level device, D2 is the second lower level device, (SD) is the device connected to (D2) and sending in ordered chain the data packets through (D2) and (D1) to (MD) and receiving data in reverse order.

A device is an electronic computing device with the ability to communicate over a wired or wireless data network, such as a smartphone, laptop, personal computer, tablet, game console, etc.

A data network is a wired or wireless connection that organizes the exchange of information between multiple devices and that may be: LAN, WAN, WLAN, Wi-Fi, Wi-Fi Direct, Bluetooth, NFC etc.

DETAILED DESCRIPTION OF THE INVENTION

According to FIG. 1, during the initial formation of the communication network, in particular the mesh network, the master device (MD) 100 determines the presence of other devices in its coverage area (network (MD) $1_{(1-n)}$). In particular, the master device (MD) 100 broadcasts radio signals, such as Wi-Fi direct or Bluetooth, to detect other devices.

The network (MD) $1_{(1-n)}$ of the master device (MD) 100 contains identification information such as the pin code and network name. Private options may use a different type of verification information required to connect to the network (MD), such as biometric data, or graphic information obtained from the camera of devices connected to the network.

In order to communicate between the devices (N) $200_1$-$200_n$ and the master device (MD) 100, the latter creates a data packet (DM) to connect the lower-level devices, which contains the necessary data, in particular the encrypted key to connect to the master device (MD) 100.

Figure 2:
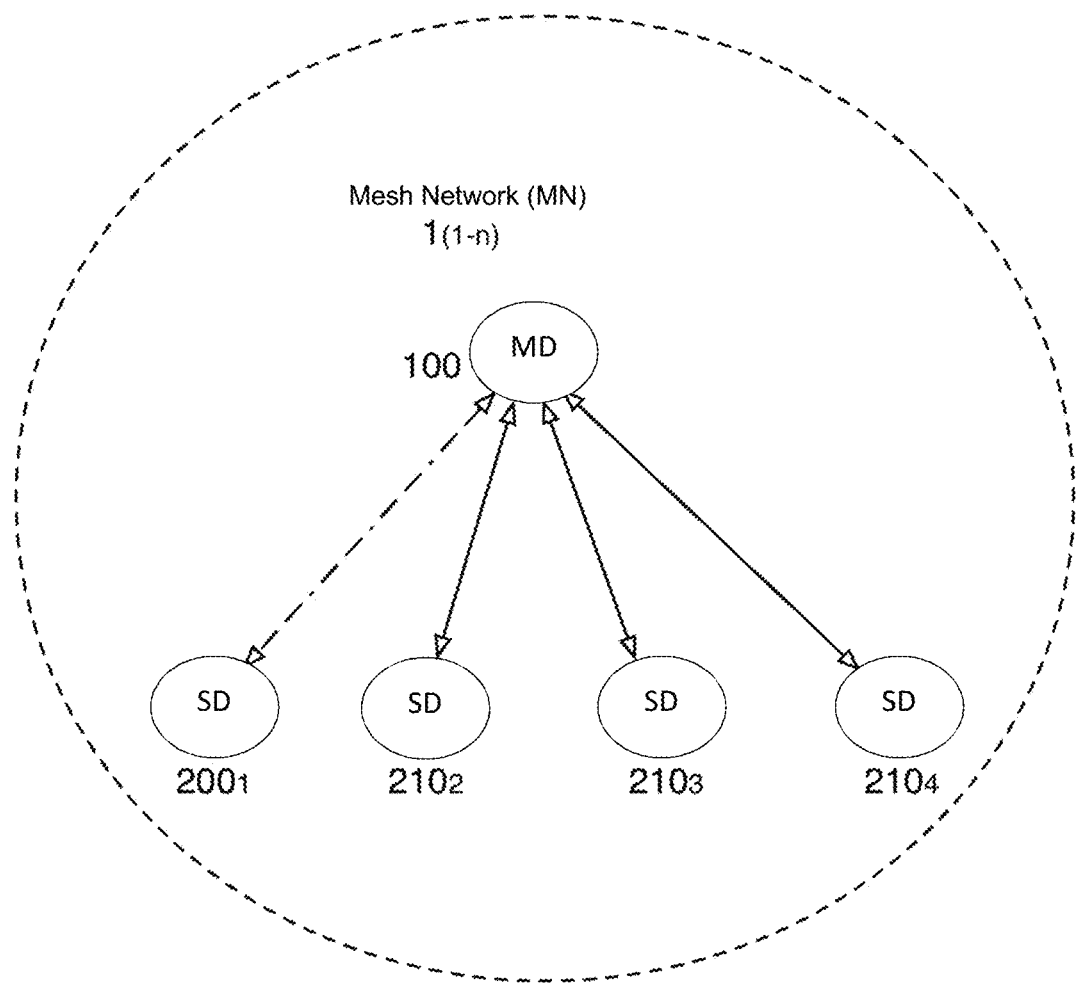

The data packet (DM) is transmitted from the device (MD) 100 to one or more devices (N) $200_1$-$200_n$ that request the connection to network (MD) $1_{(1-n)}$. According to FIG. 2, the devices (N) $200_1$-$200_n$ are connected directly to the master device (MD) 100. When connected to the master device (MD) 100 on the mentioned device (N) $200_1$-$200_n$, the device name (N) $200_1$-$200_n$ and the network pin code are entered. In response to the data entered, the device (N) $200_1$-$200_n$ generates a response data packet (DN) containing the response key calculated on the basis of the data of the device (N) $200_1$-$200_n$ and the information received in the said data packet (DM) from the master device (MD) 100.

Then, in response to the data packet (DN) received from the said device (N) $200_1$-$200_n$, the device (MD) 100 calculates the connection key based on the data of the device (MD) 100 and the information from the said data packet (DN) received from the device (N) $200_1$-$200_n$. On the master device (MD) 100 one carries out comparison of the received keys and if the keys coincide, one establishes constant connection with the mentioned device (N) $200_1$-$200_n$, and such device (N) $200_1$-$200_n$ changes the status to the slave device (SD) $210_1$-$210_n$.

Figure 3:
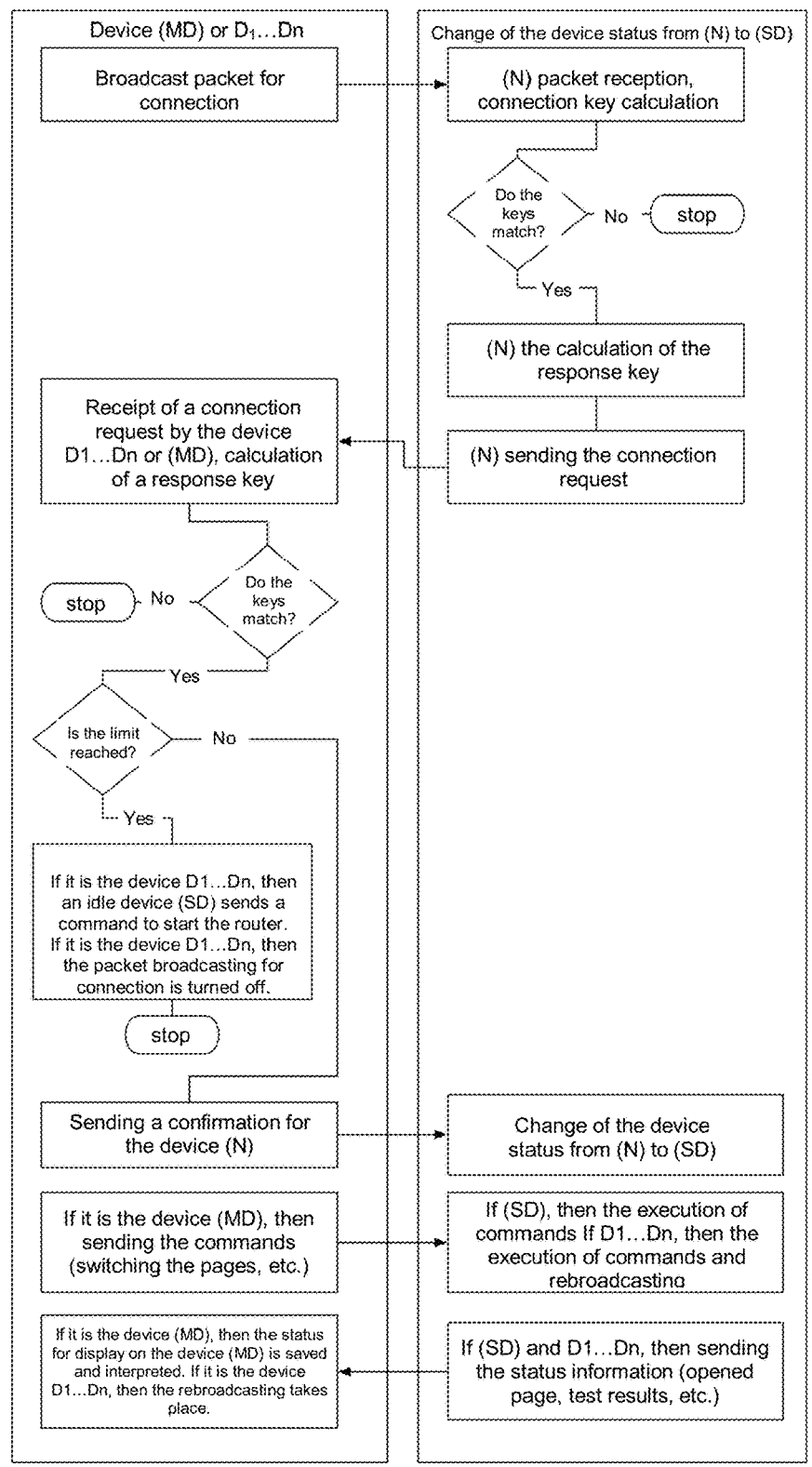
FIG. 3 illustrates the process of connecting network devices.

FIG. 3 shows in more detail how to connect the devices (N) $200_1$-$200_n$ to the master device (MD) 100. The primary data packet from the master (MD) 100 is a broadcast packet and usually contains the following parameters:

PeerID—server identifier (to connect thereto)

discoveryKey SHA1—a hash based on network name, pin code of the network, master device name, fixed line teacherName—master device name.

The response packet (DN) transmitted from the connected device (N) $200_1$-$200_n$ to the master device (MD) 100 usually contains the following data:

PeerID—client ID connectionKey SHA1—a hash based on the student name, network name, network pin-code, master device name, UUID of the device, fixed line studentName—device name UUID—device ID The remaining set of information on the basis of which the response key is calculated to connect new devices (N) $200_1$-$200_n$ to the master device (MD) 100, includes: device name, network name, network pin code, master device name (MD) 100, globally unique device identifier, code information.

Each of the devices forming the claimed mesh network contains a specified limit (L) on the number of simultaneous connections to each type of device. When making the first connections, the master device (MD) 100 checks whether the specified limit on the connection of slave devices (SD) $210_1$-$210_n$ has been reached, and if the limit (L) has been reached, the master device (MD) 100 generates a command to activate the router/repeater function, which is sent to all devices (SD) connected thereto $210_1$-$210_n$. In this case, each of the slave devices (SD) $210_1$-$210_n$, connected directly to the master device (MD) 100, transmits data about its status to the master device (MD) 100 directly.

Figure 4:
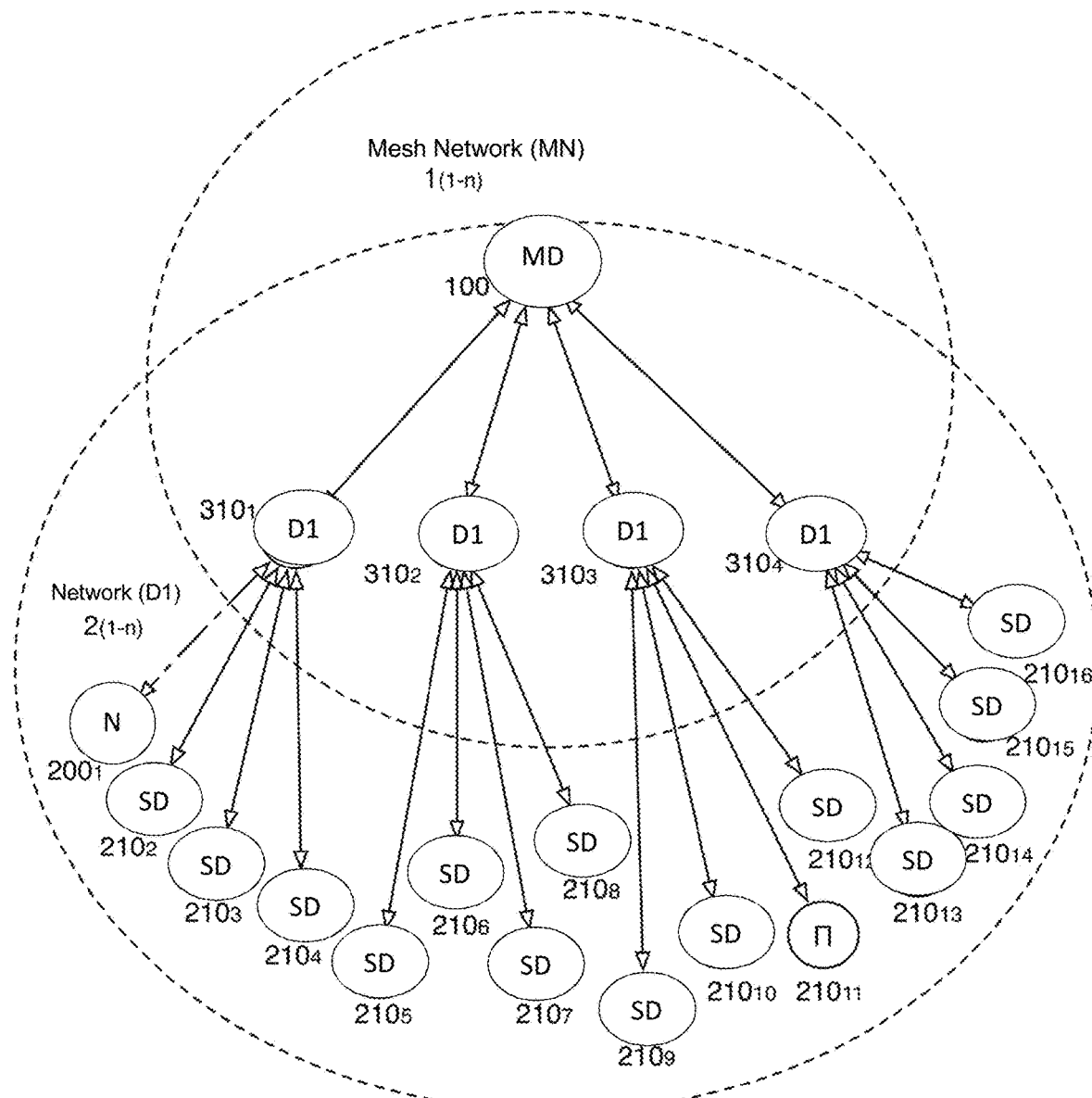
FIG. 4-FIG. 5 illustrate a mesh network diagram using network devices as repeaters.

According to FIG. 4 based on the above command, the first lower level (D1) $2_{(1-n)}$ of the network (MD) is formed by changing the status of the devices (SD) $210_1$-$210_n$ connected directly to the master device (MD) 100, to the activated devices (AN) $310_1$-$310_n$, and each new device (N) $200_1$-$200_n$ when trying to connect to the mesh network is connected to the line device (D1) $310_1$-$310_n$, which in response to the connection of a new device (N) $200_1$-$200_n$ changes its status to a slave device (SD) $210_1$-$210_n$ connected through one of the routers/repeaters of the line (D1) $310_1$-$310_n$ of the first lower level to the master device (MD) 100. Thus, with the help of activated devices (SD) $210_1$-$210_n$, which changed their status to routers (D1) $310_1$-$310_n$, the network (D1) $2_{(1-n)}$ of the lower level is formed in comparison with the master device (MD) and its network (MD) $1_{(1-n)}$.

The command generated by the master device (MD) 100 to activate the router/repeater function is a data packet that is sent when the limit (L) is reached (FIG. 3). The mentioned data packet contains control commands and a globally unique identifier of the device to which it is intended.

The master device (MD) 100 of the first higher level is responsible for the formation (creation of the network pin code, name and key for connection); constant broadcasting of the packet for connection the (N) $200_1$-$200_n$ devices, registration of the connected devices (SD) $210_1$-$210_n$ and paths thereto via devices ($D_1$)-($D_n$)), configuration (sending commands to switch the devices from (SD) to ($D_1$)-($D_n$) mode) and monitoring (registration of the loss of connection with devices (SD) and ($D_1$)-($D_n$) both in case of a controlled disconnection and in case of the disconnection by timeout) of the mesh network (MN) in real time.

According to FIG. 4, all new slave devices (SD) $210_2$-$210_{16}$ become the slave ones in regards to the idle routers (D1) $310_1$-$310_4$. Each of the routers (D1) $310_1$-$310_4$ also contains its own limit (L) on the number of simultaneous connections thereto.

Figure 5:
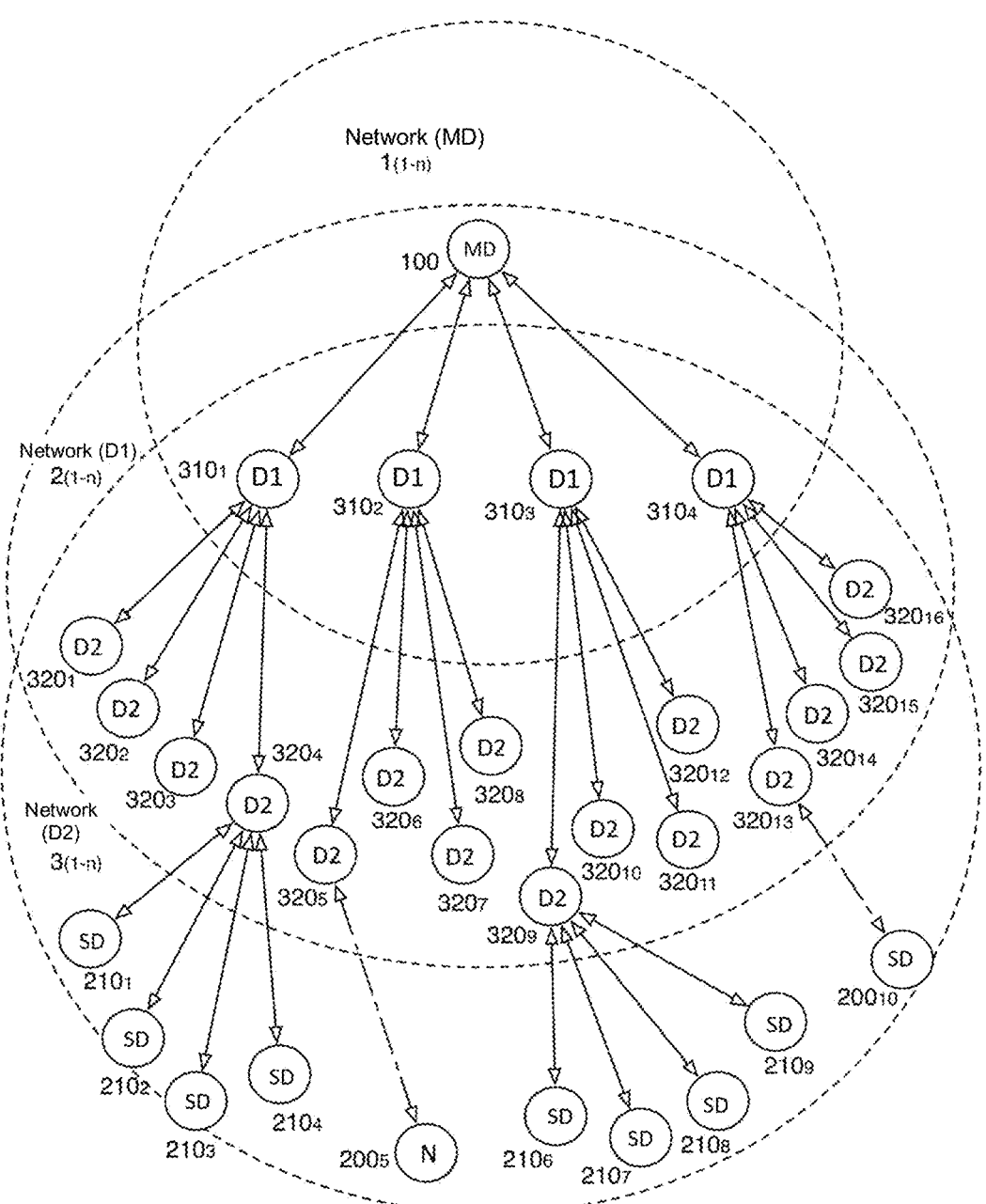

As you can see from the FIG. 5 when one of the routers (D1) $310_1$-$310_4$ reaches the mentioned limit (L), when trying to connect a new device (N) $200_5$-$200_{10}$ in excess of the limit for the line (D1), the devices (D1) $310_1$-$310_4$ cut off the possibility of connecting new devices (N), at the same time, the devices (N) request connection from the master device (MD) 100, which in response to the above requests from the devices (N) $200_5$-$200_{10}$ analyzes the network map and sends a command to the devices (SD) connected to the line devices (D1) $310_1$-$310_4$ to activate the router/repeater mode. Based on the mentioned command, the second lower level (D2) $3_{(1-n)}$ of the mesh network (MN) is formed by changing the status of devices (SD) $210_1$-$210_n$ connected to routers (D1) $310_1$-$310_4$ to the status of activated devices (D2) $320_1$-$320_n$, whereas each new device (N) $200_1$-$200_n$, when trying to connect to a mesh network, connects to a line device (D2) $320_1$-$320_n$, which, in response to a new device (N) $200_1$-$200_n$ connected thereto, changes its status to a slave device (SD) $210_1$-$210_n$, connected via one of the routers/repeaters of the line (D2) $320_1$-$320_n$ of the second lower level to the router/repeater of the line (D1) $310_1$-$310_n$ of the first lower level connected to the master device (MD) 100.

Figure 6:
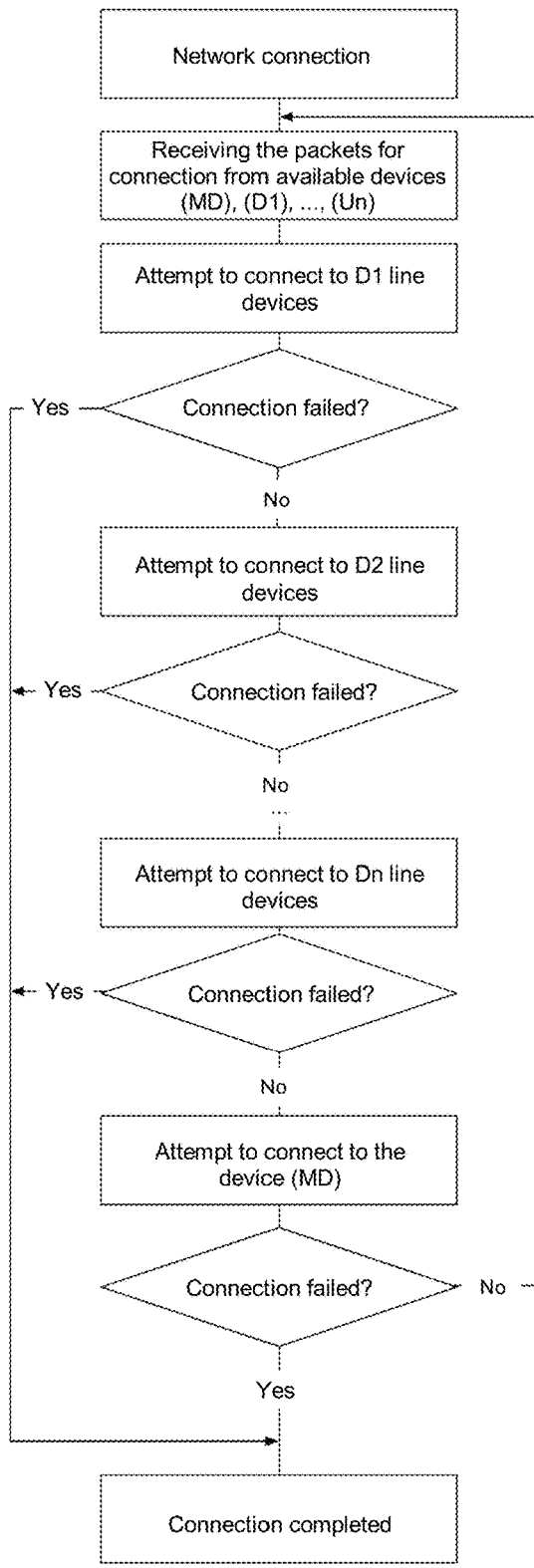
FIG. 6 illustrates the block diagram of mesh network levels formation.

It should be noted that with this new device connection scheme, the number of possible connection levels is not limited. FIG. 6 shows a diagram of the general steps in the formation of the claimed mesh network. The analysis of the devices available for connection is carried out from top to bottom, starting from the devices not closed for access thereto.

Figure 7:
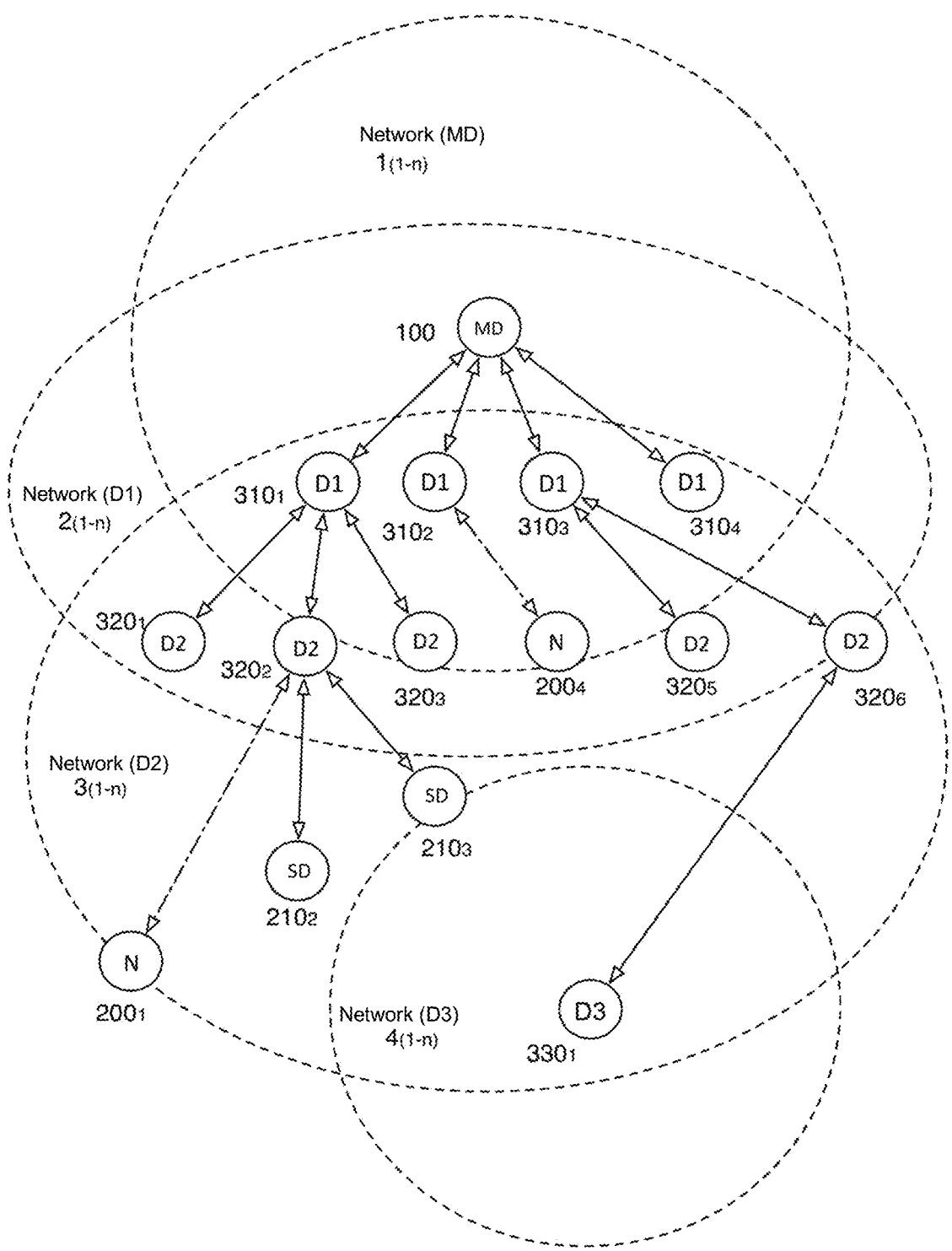
FIG. 7 illustrates a mesh network diagram, using network devices as repeaters.

According to FIG. 7, the slave devices (SD) $210_1$-$210_n$, connected to routers of the second level (D2) $320_1$-$320_n$, when the devices (D1) $310_1$-$310_n$ reach the limit (L), receive from the master device (MD) 100 a command to activate the routers/repeaters functions and change their status to activated devices (D3) $330_1$-$330_n$. Thus, the (D3) $4_{(1-n)}$ level is formed. The further chain of connection will follow the same principle.

If the connection to one or more routers/repeaters ($D_1$)-($D_n$) is broken, the slave devices (SD) and/or lower level devices ($D_1$)-($D_n$) connected through it change their status to new devices (N) and begin to reconnect, actually repeating the connection process described above. The connection is re-established by connecting to the available active devices ($D_1$)-($D_n$) and/or the master device (MD) if the number of devices connected thereto has decreased, and the set limit (L) allows new devices to be reconnected thereto.

Thus, the construction of an organized system consisting of many devices controlled by a single top-level master device, which has the functions of self-organization and high flexibility to rebuild its nodes to achieve a stable and rapid connection of new devices.

The following is a private example of how to use the claimed method of communication between multiple devices, using the claimed mesh network.

The developed method of organizing a mesh network is used for conducting classes with many students, without the need to use an external data network, such as the Internet or Wi-Fi network created by the access point.

As shown in FIG. 7, the teacher's master device, the tablet, starts the lesson application. The application performs the necessary functions, in particular: creation of a communication network, assignment of device status, management of the material under study, etc.

Figure 8:
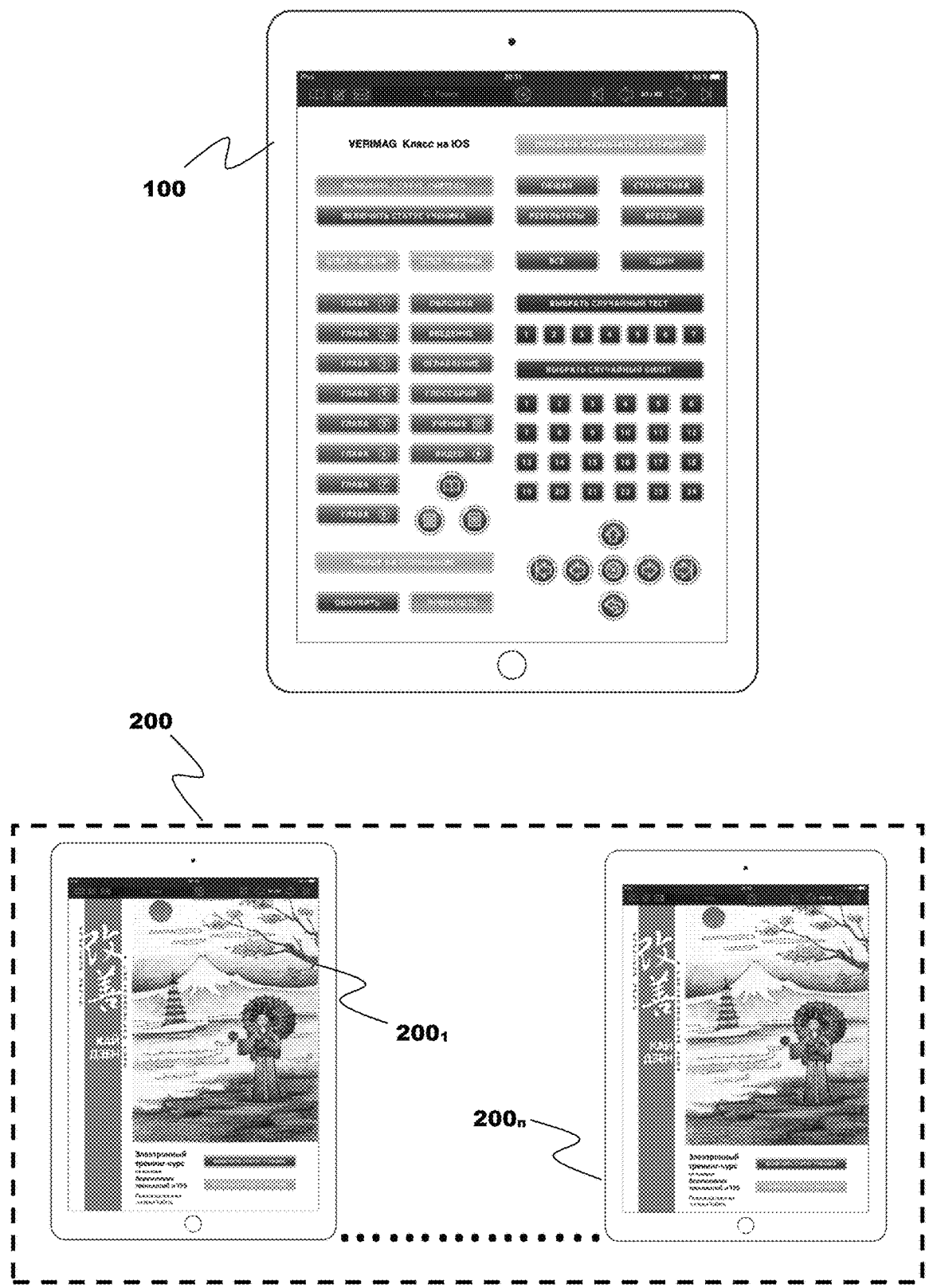
FIGS. 8-16 illustrate an example of the implementation of mobile class, with the help of the claimed method of organizing the mesh network.

When the "Enable teacher status" application function is activated, the device on which this function is activated becomes the master device and, according to FIG. 8, generates data for connecting other devices thereto (network pin code, device name). Devices (N) activate student status and exchange data packets to establish a connection with the master device (MD).

FIG. 8 shows that when you activate the "Declare" function, which is activated with the help of the mentioned application, the master device—the teacher—generates a pin code to access the lesson. Student devices (N), being within the range of the teacher's device radio network, see the available lesson, for the connection to which one enters the lesson's pin code and the student's device name.

Figure 9:
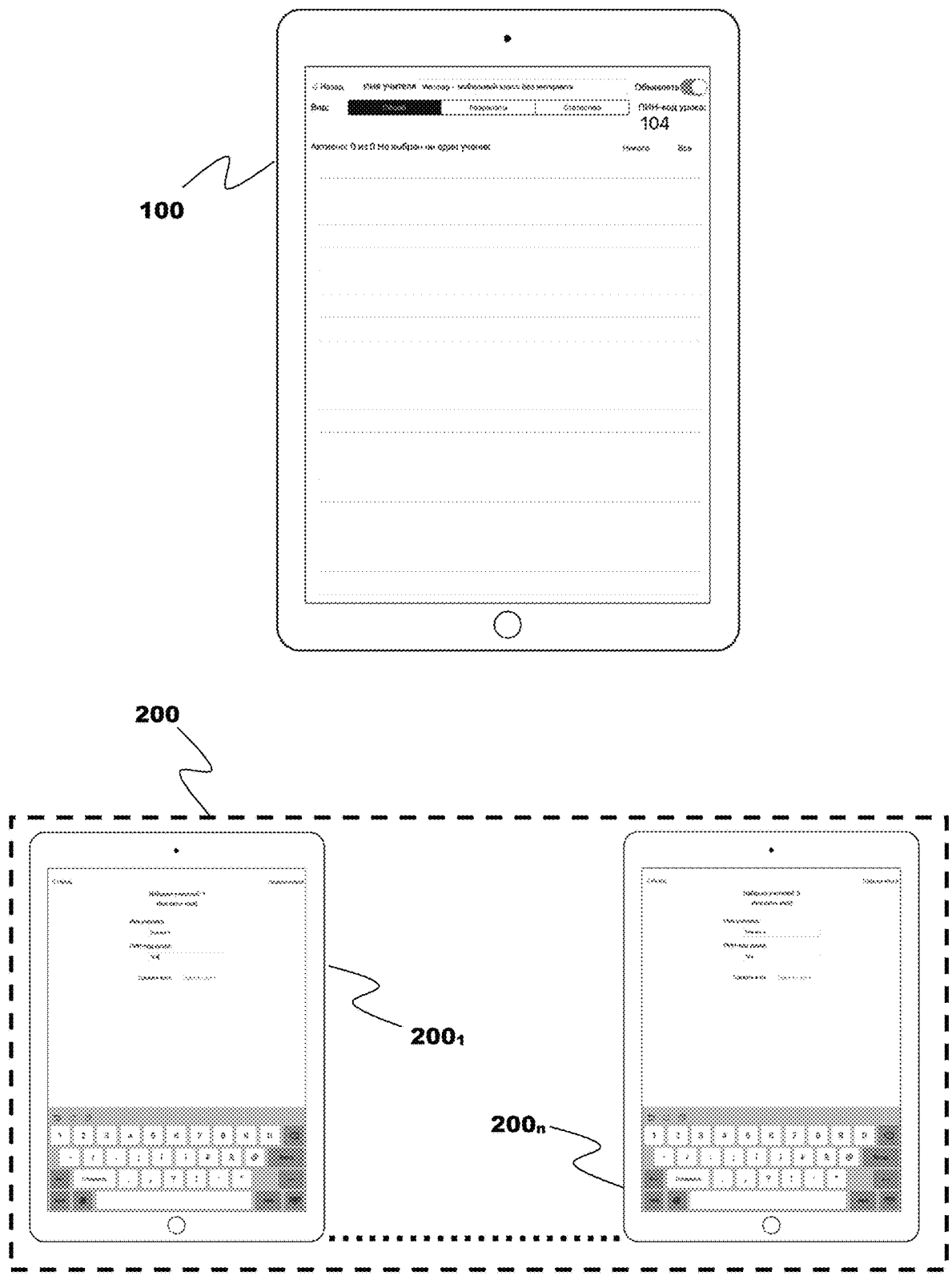

When students' devices are connected to the teacher's device they change their status to slave devices (SD) and become connected directly to the teacher's device. According to FIG. 9 all currently connected students' devices are displayed on the teacher's device, in particular, the names of the connected devices are displayed.

Figure 10:
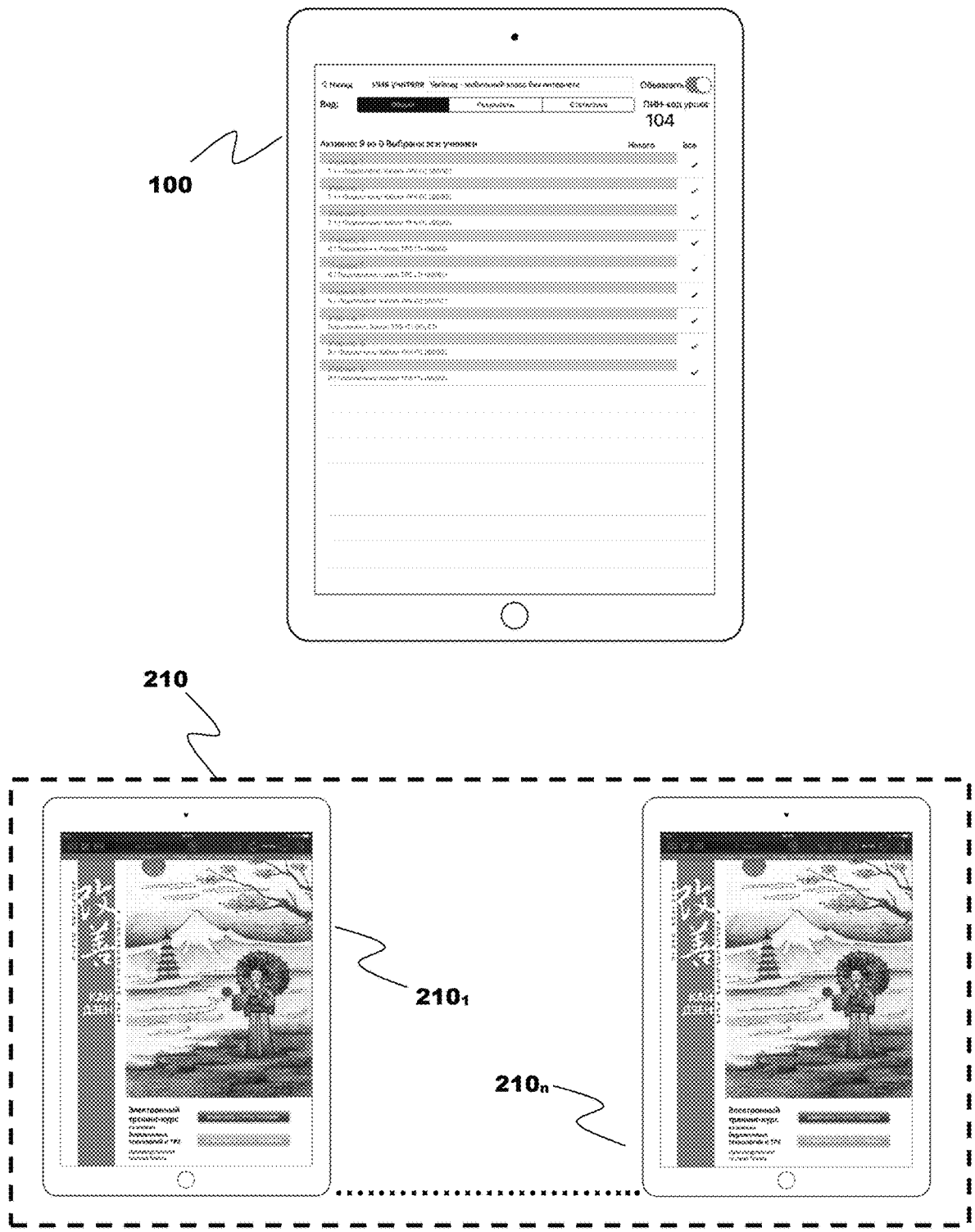
Figure 11:
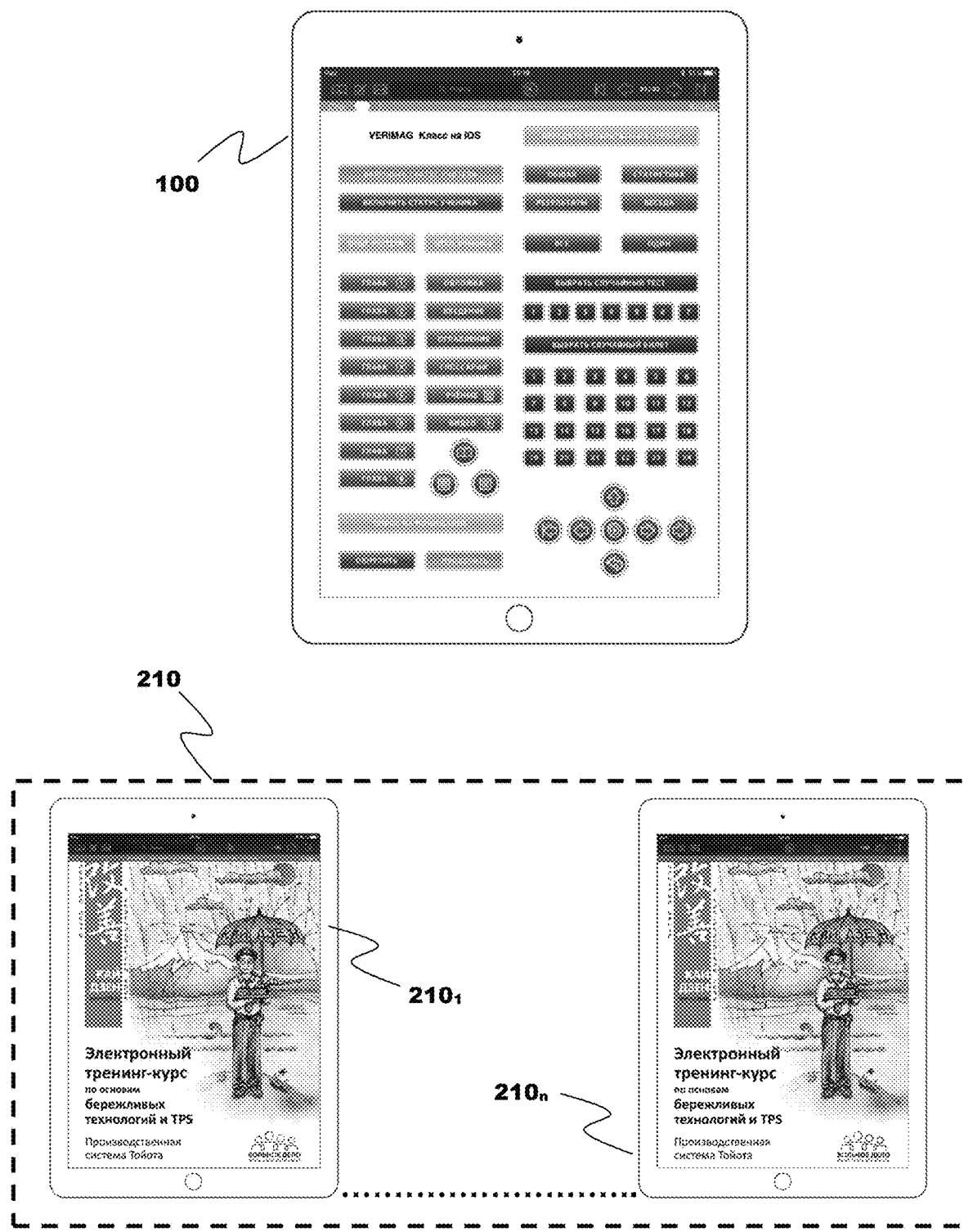

FIG. 10 shows an example of the transfer of a command from the teacher's device to the students' device. The command may consist, for example, in going to the training course page, activating the media element of the course (video, presentation, audio message, etc.). FIG. 10 shows the activation of the function to go to the main page of the course. A course is a specialized multimedia interactive publication that is installed in an application for conducting classes on students' and teacher's devices. When receiving a command from the teacher's device, all students' devices immediately execute it, as, for example, shown in FIG. 10, when activating the transition mode to the title page, all the students' devices, no matter where the course is now open on each device, go to the part of the course indicated by the teacher. As an example, this is shown in FIG. 11, which shows the sending of the command from the teacher's master device to go to the 22nd page of the course, which all the connected students' devices immediately execute.

Figure 12:
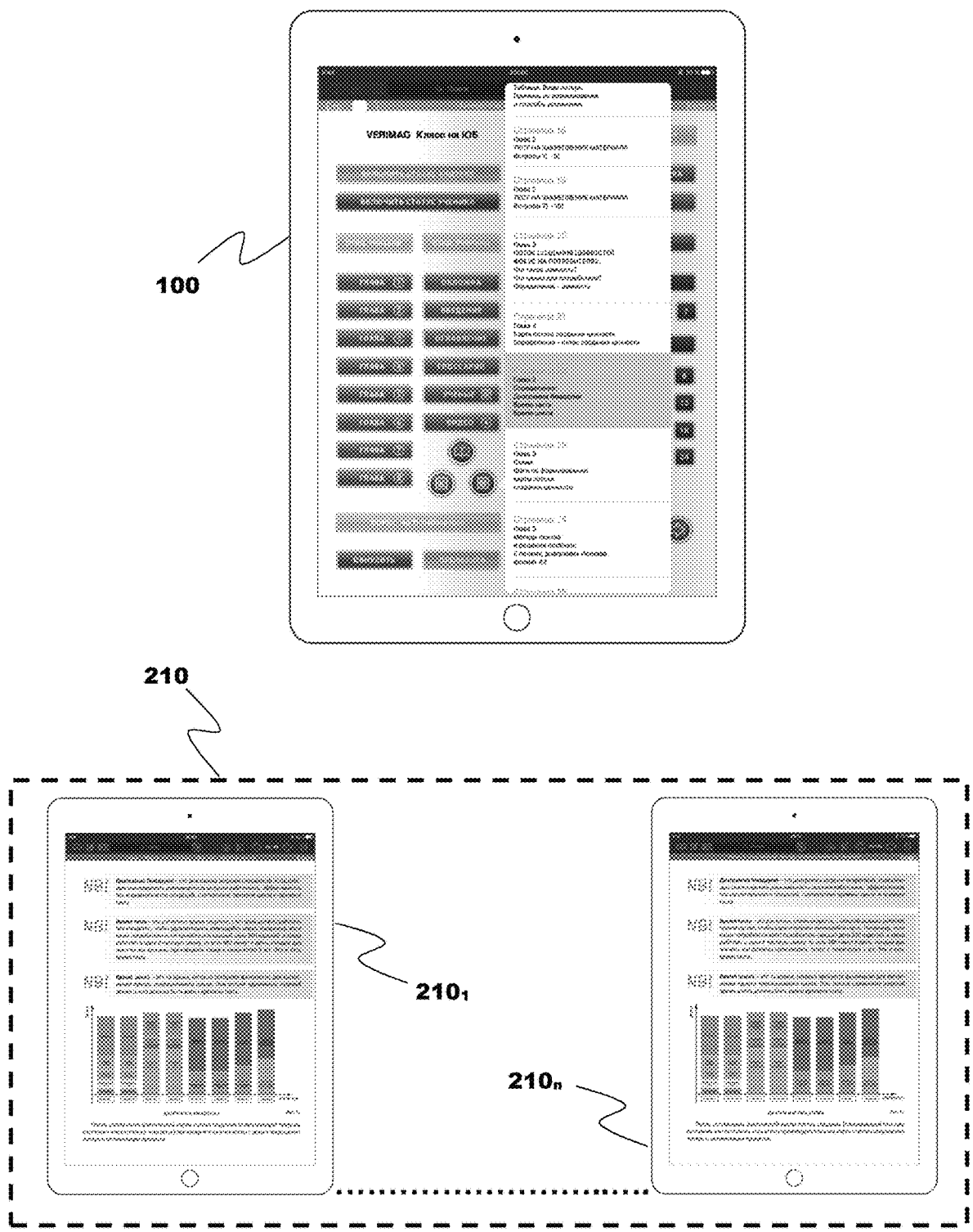
Figure 13:
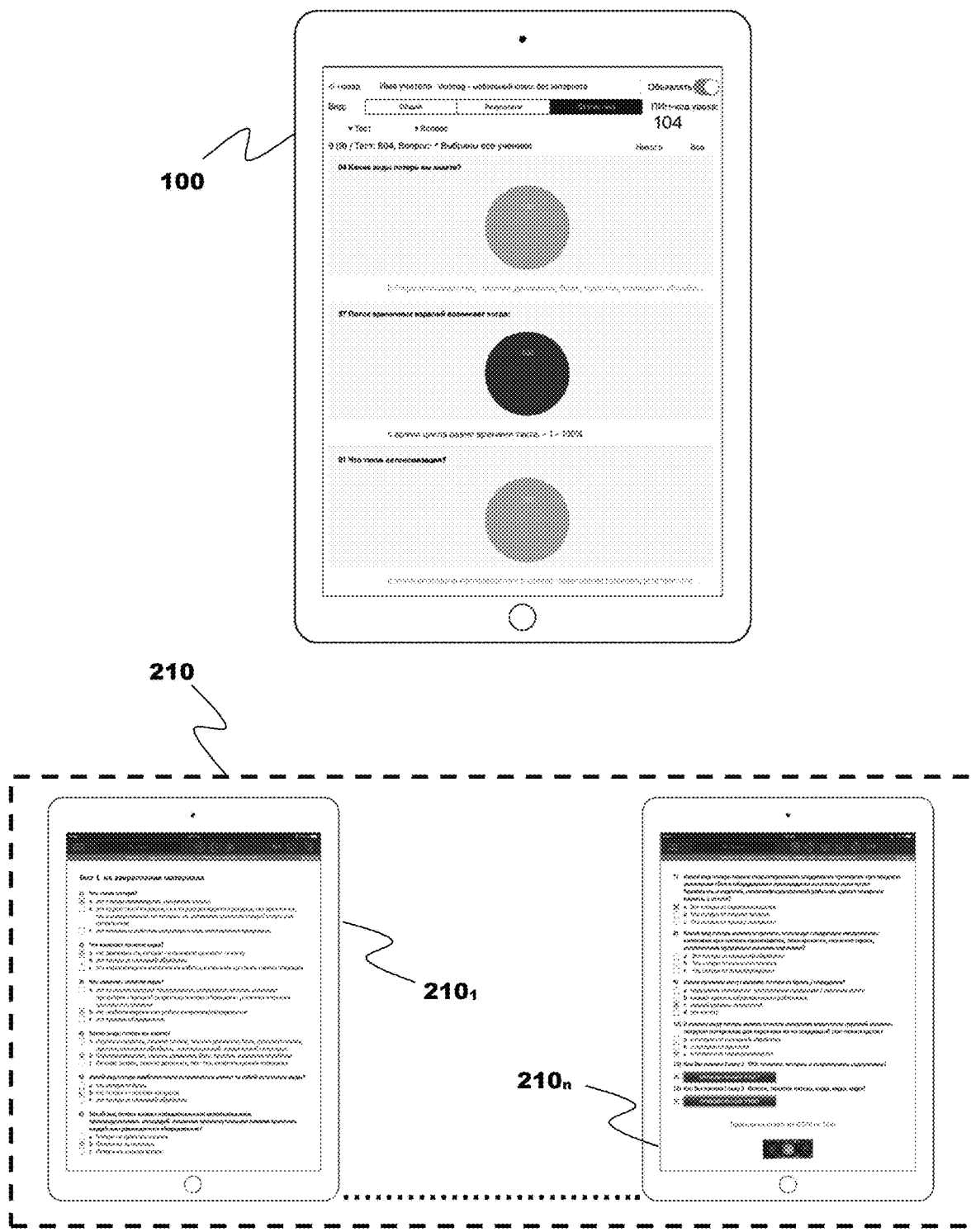
Figure 14:
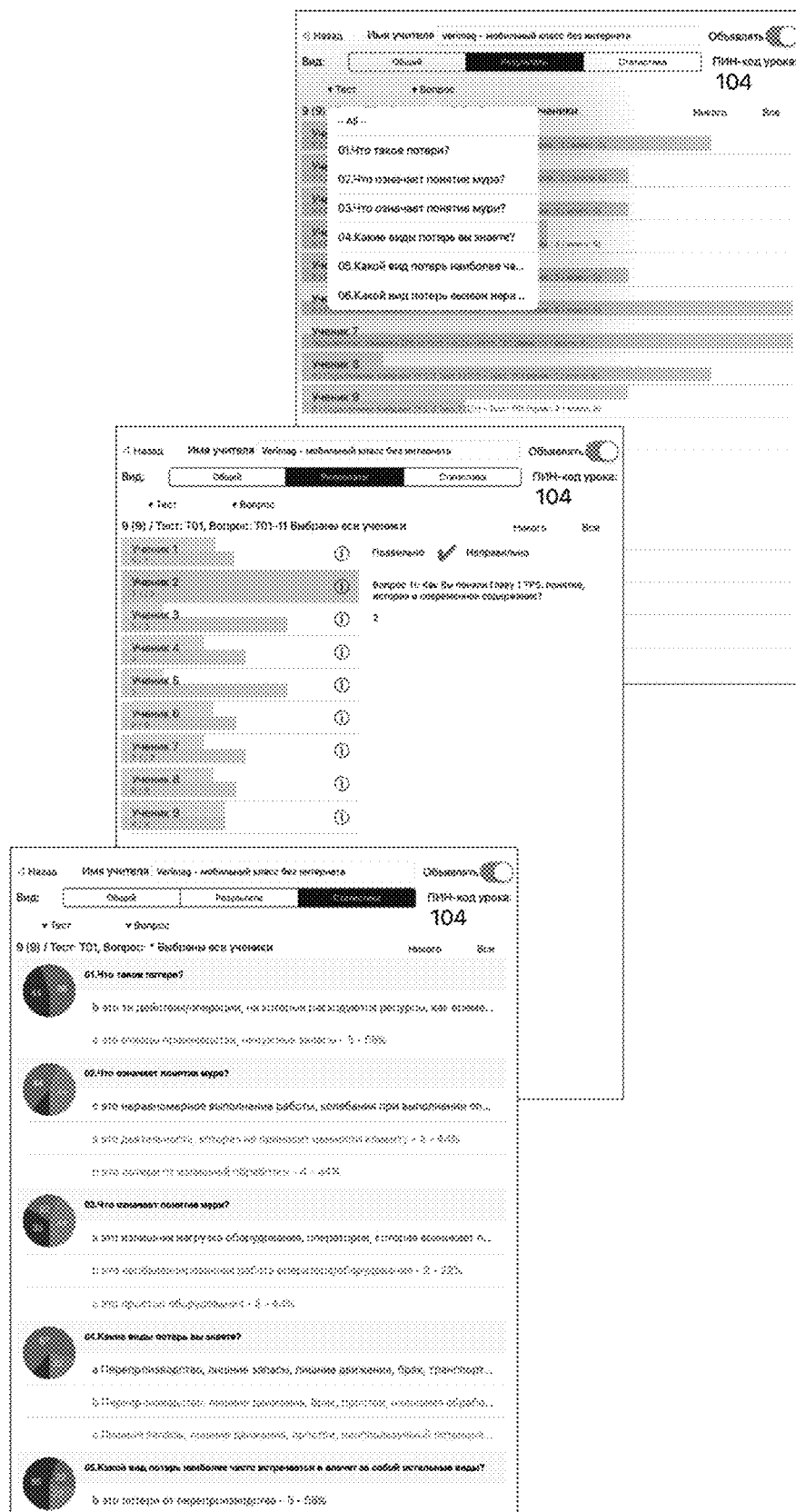
Figure 15:
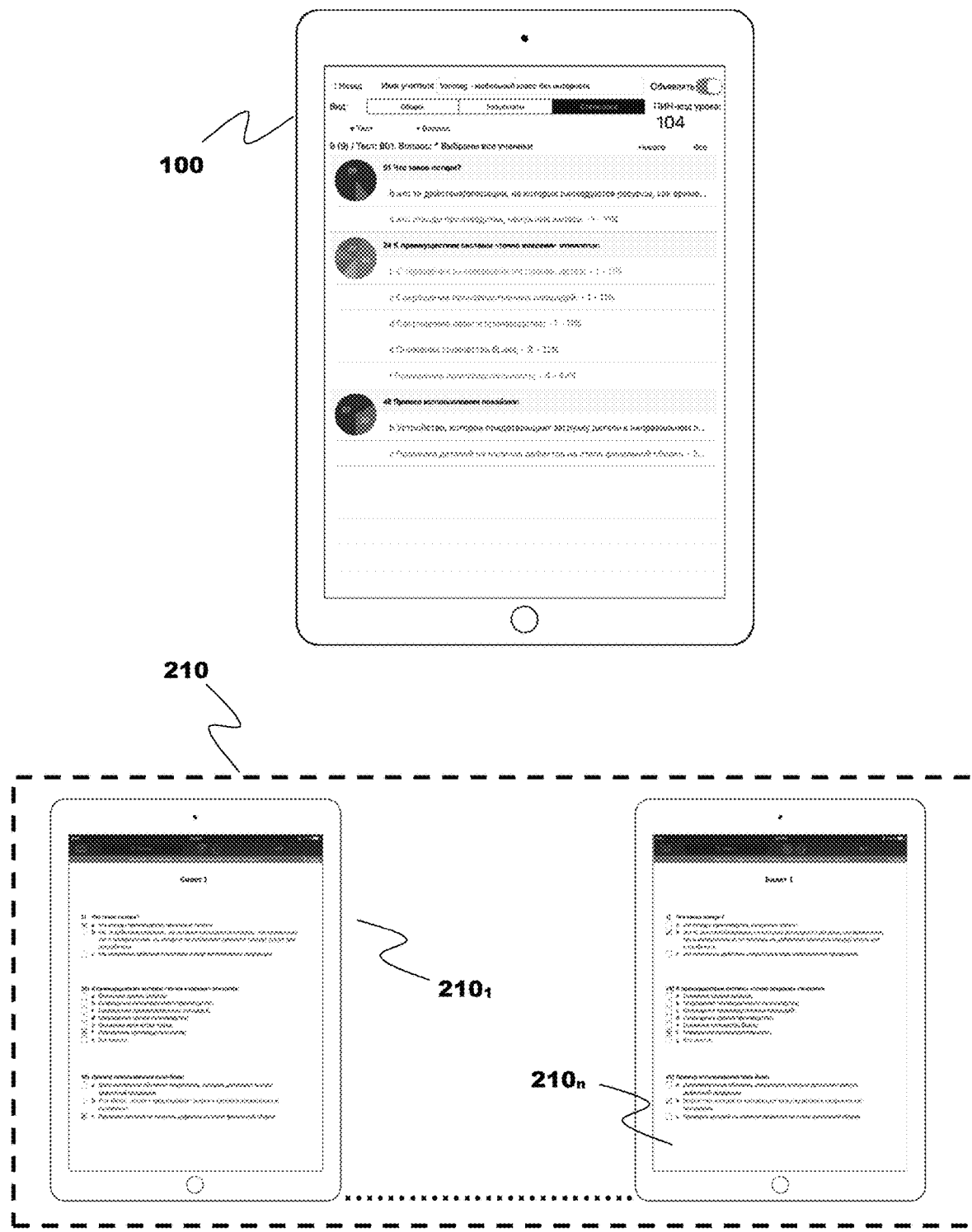
Figure 16:
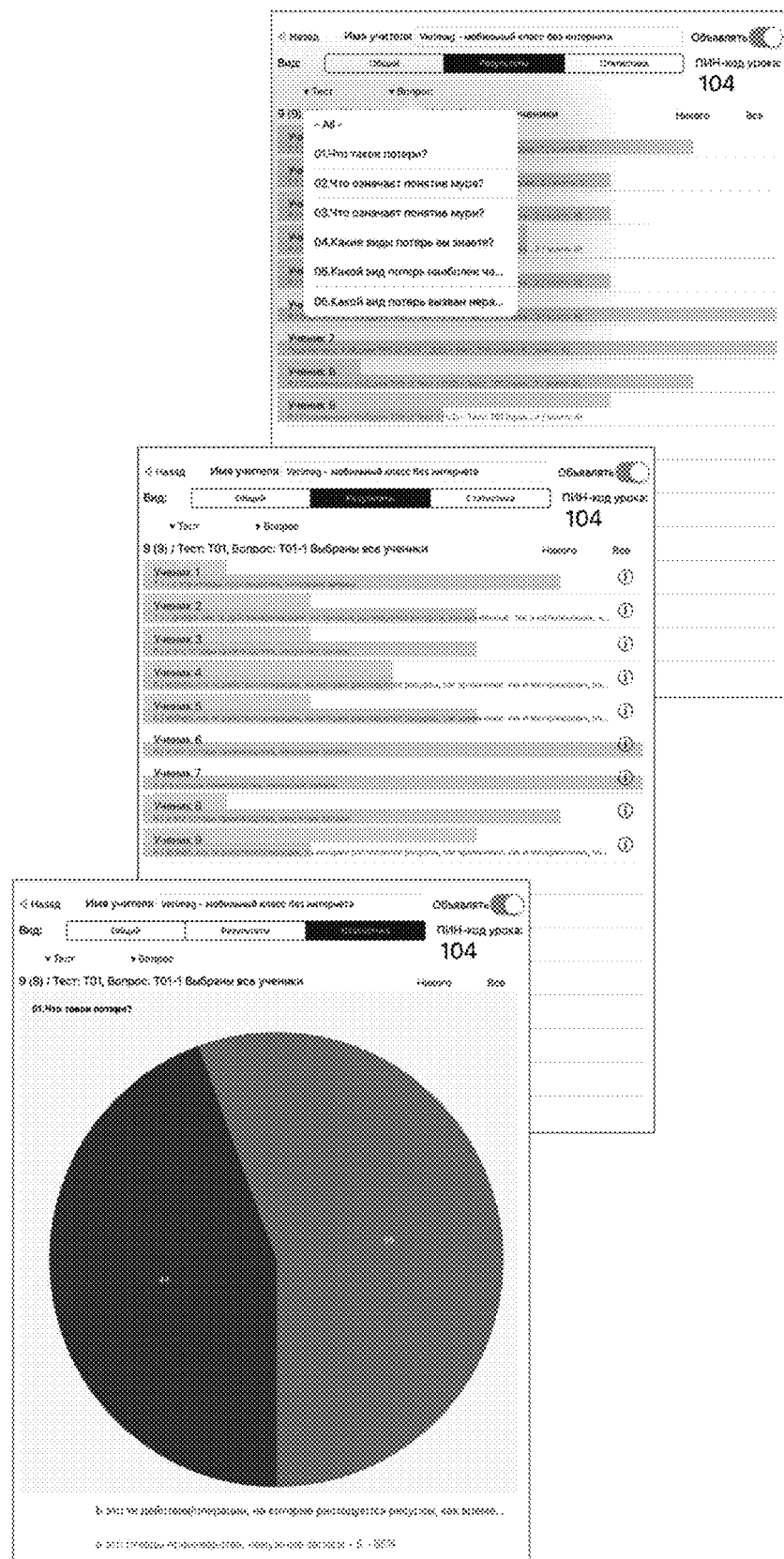

This course allows you to conduct test exercises within the application itself with the sending of the results on the master device of the teacher. FIGS. 12-13 show that the results of the passed tests are transmitted to the teacher's tablet, on which you can view the information received, both for each student and the general statistics. FIG. 14 presents an example of an examination question, information on which, by analogy with the examples presented above, after its implementation on the students' devices is transmitted to the teacher's tablet to display the statistics of the completed task.

When new devices appear, which also are to participate in the course mentioned, when they get into the network range of the master device, they try to establish a connection therewith. If the teacher's tablet reaches the specified limit (L) on the number of simultaneous direct connections of students' devices thereto, then it forms a command that it sends out to the students' devices directly connected therewith. When students' devices receive this command, they activate the router/repeater mode to connect new students' devices thereto. New students' devices will be managed by the teacher's master device through the appropriate students' node devices, which have changed their status to routers. Changing the status of students' devices does not affect the speed of receiving the control commands from the teacher's master device and the connection of new devices thereto occurs automatically.

The examples given in this application in regard to the embodiment of the claimed invention are not restrictive of other private embodiments of the claimed invention which do not go beyond the claimed protection scope and are obvious to a person skilled in the art.

The invention claimed is:

1. A method of organizing a mesh network for communication between a plurality of devices, the method comprising:

activating, by a master device a function for organizing the mesh network;

creating, by the master device, a network name and a pin code;

forming, by the master device, a first data packet to connect devices to the mesh network, the first data packet containing a first key to connect to the master device, wherein the master device limits an amount of devices connected to the master device to a specified limit;

transmitting, by the master device, the first data packet to at least one device connected directly to the master device;

transmitting, by the at least one device, a second data packet containing a second key calculated, based at least in part on the first data packet;

after receiving, by the master device, the second data packet, calculating, by the master device a third key based at least in part on the second data packet;

after comparing, by the master device, the second key and the third key, and verifying that the second key and the third key coincide, establishing a permanent connection with the at least one device;

changing a status of the at least one device to a slave device;

after reaching the specified limit, and when trying to connect a first new device in excess of the specified limit, commanding, by the master device, slave devices of the master device to activate a router mode, thereby forming a first level of the mesh network, wherein each new device trying to connect to the mesh network is then connected to a device of the first level, and, in response to connection of the first new device to the mesh network, the first new device changes its status to a slave device connected to the master device through a device of the first level;

after reaching the specified limit on the first level when trying to connect a second new device over and above the specified limit for the first level, receiving, by the master device a request to connect the second new device;

in response to the request to connect the second new device, analyzing, by the master device, a map of the mesh network; and sending, by the master device, a command to devices connected to the first level to activate the router mode, thereby forming a second level of the mesh network, wherein each new device trying to connect to the mesh network is then connected to a device of the second level, wherein in response to connection of the second new device to the mesh network, the second new device changes its status to a slave device connected to the master device through a device of the second level.

2. The method according to claim 1, wherein changing the status of the at least one device to a slave device comprises transmitting a third data packet.

3. The method according to claim 2, wherein the third data packet is formed by the master device in response to reaching the specified limit.

4. The method according to claim 1, wherein the master device performs the formation, configuration and monitoring of the mesh network in real time.

5. The method according to claim 1, wherein the master device, when connected to one or more devices of the first or second levels, transmits data packets containing control commands to the one or more devices, and wherein each of the data packets comprises a globally unique identifier of one of the one or more devices.

6. The method according to claim 1, wherein, after reaching the specified limit for the first level, the devices of the first level refuse connections from any new devices.

7. The method according to claim 1, wherein each slave device connected directly to the master device directly transmits data about its state to the master device.

8. The method according to claim 1, characterized in that all devices of the first level and the second level generate a third data packet for connecting new devices and then changing the status of the new devices into slave devices.

9. The method according to claim 1, wherein each device of the second level contains a set limit on connecting new devices, and when the set limit is reached each device stops generating a third data packet for connecting new devices.

10. The method according to claim 1, wherein the second key is calculated based at least in part on the following: device name, network name, network pin code, master device name, globally unique device identifier, and code information.

11. The method according to claim 1, wherein devices are connected to the mesh network via wired or wireless communication.

12. The method according to claim 1, further comprising sending, by the master device, a command to devices of the second level to activate the router mode, thereby forming a third level of the mesh network, and wherein each new device trying to connect to the mesh network is then connected to a device of the third level.

13. The method according to claim 1, further comprising, after a connection with one or more router is broken, slave devices and/or devices of the first level change their status to new devices and begin to restore the connection.

14. The method according to claim 13, wherein the reconnection is carried out by connecting to available active devices and/or the master device.

15. A mesh networking system for establishing a mesh network for communication between multiple devices, the mesh networking system containing the following:

a master device configured to:
  organize the mesh network;
  create a network name and a pin code to access the mesh network;
  form a first data packet for connecting devices to the mesh network, wherein the first data packet contains at least an encrypted key to connect to the master device; and
  transfer the first data packet to at least one device connected directly to the master device, wherein the master device contains a specified limit on a number of connections to the master device;
a device directly connected to the master device, and when connected to the master device, the device is configured to receive a name of the device and a network pin code, and wherein the device is configured to transmit a second data packet containing a return key, calculated on the basis of data of the device and information received in the first data packet from the master device;
wherein the master device is configured to, in response to receiving the second data packet from the device, calculate a key based at least in part on the second data packet and compare the key to the return key and, if the said keys coincide, establish a permanent connection with the device and change a status of the device to a slave device;
wherein the master device is configured to, after reaching the specified limit, send a command to slave devices to activate a router mode, thereby forming a first level of the mesh network, and wherein each new device, when trying to connect to the mesh network is connected through a device of the first level; and
wherein the master device is configured to, after reaching the specified limit of devices connected to the first level, analyze the mesh network and send a command to slave devices connected to the first level to activate the router mode, thereby forming a second level of the mesh network, and wherein each new device when trying to connect to the mesh network, is connected through a device of the second level.

* * * * *